(12) United States Patent
Doyle et al.

(10) Patent No.: US 6,424,709 B1
(45) Date of Patent: Jul. 23, 2002

(54) SKILL-BASED CALL ROUTING

(75) Inventors: Robert J. Doyle, Newbury Park, CA (US); Kurt E. Sunderman, Geneva, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/273,926

(22) Filed: Mar. 22, 1999

(51) Int. Cl.[7] .......................... H04M 3/523; H04Q 3/64
(52) U.S. Cl. ........................................ 379/265; 379/266
(58) Field of Search ............................... 379/214, 265, 379/266, 309

(56) References Cited

U.S. PATENT DOCUMENTS

| | | | |
|---|---|---|---|
| 5,164,983 A | * 11/1992 | Brown et al. | 379/265 |
| 5,206,903 A | 4/1993 | Kohler et al. | 379/265.12 |
| 5,335,269 A | 8/1994 | Steinlicht | 379/266 |
| 5,903,641 A | 5/1999 | Tonisson | 379/265.12 |

* cited by examiner

Primary Examiner—Harry S. Hong
(74) Attorney, Agent, or Firm—Welsh & Katz, Ltd.

(57) ABSTRACT

A method and apparatus are provided for assigning a plurality of agents to incoming calls by an automatic call distributor. The method includes the steps of defining a plurality of agent groups for processing calls received by the automatic call distributor and assigning at least some agents of the plurality of agents to an agent group of the plurality of agent groups based upon a skill level of the at least some agents and a set of required qualifications for the agent group. The method further includes the steps of delivering calls to the at least some agents of the agent group based upon the required qualifications for the agent group and upon agent idle time, monitoring a call loading of the agent group and adjusting a number of the at least some agents of the group based upon the monitored call loading.

46 Claims, 3 Drawing Sheets

SKILL-BASED CALL ROUTING

FIELD OF THE INVENTION

The field of the invention relates to telephony systems and more particularly to automatic call distributors used with private networks.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In other systems, where skill is considered essential for call handling, a call may be directed to an agent group considered the most skilled for the call considered. In these systems, a database of customer records is maintained. Customers are identified to the ACD and database by features such as automatic number identifier (ANI).

In order to staff an ACD, an organization often relies on historical levels (in Erlangs) of incoming calls to the individual call targets. A manager of the ACD may examine the historical call loading record, add or subtract a percentage of the historical loading based upon a most recent call history (e.g., the most recent week or month), and estimate a staffing level based upon those calculations. Alternatively, some organizations have relied upon commercially available predictive software (i.e., force management packages) which calculates daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group is separately staffed based upon an Erlang estimate for that group.

As an alternative to staffing individual groups, some systems group all agents together and assign a skill rating to each agent. Calls are then assigned based upon the skill rating of the agent for handling that type of call.

For example, where a single group is used, an ACD will always look for and assign the call to the most qualified agent. However, some agents are more qualified than others. Because of the differences in qualifications, some agents receive more calls than others, resulting in an inequitable work load.

Further, where all agents are grouped together, an Erlang rate for any one group becomes irrelevant. For example, one benefit of using a common group relates to economies of scale. Two separate groups that separately require 10 agents each would typically only require 18 agents from a common pool of agents.

Further, it is difficult, if not impossible for call center management to known how many agents are serving a particular call target. Because of the difficulty of determining agent loading, it is also difficult to project staffing requirements in a shared agent environment.

Where all agents are grouped together, staffing estimates must be based upon an Erlang rate of the organization as a whole. Basing a staffing estimate upon an organization as a whole is subject to large errors. Because of the importance of call handling through ACDs, a need exists for a method of assigning agents which is more flexible than the individual group method, but which may still be staffed based upon Erlang estimates of the individual call groups.

SUMMARY

A method and apparatus are provided for assigning a plurality of agents to incoming calls by an automatic call distributor. The method includes the steps of defining a plurality of agent groups for processing calls received by the automatic call distributor and assigning at least some agents of the plurality of agents to an agent group of the plurality of agent groups based upon a skill level of the at least some agents and a set of required qualifications for the agent group. The method further includes the steps of delivering calls to the at least some agents of the agent group based upon the required qualifications for the agent group and upon agent idle time, monitoring a call loading of the agent group and adjusting a number of the at least some agents of the group based upon the monitored loading.

DETAILED DESCRIPTION OF A PREFERRED EMBODIMENT

Figure 1:
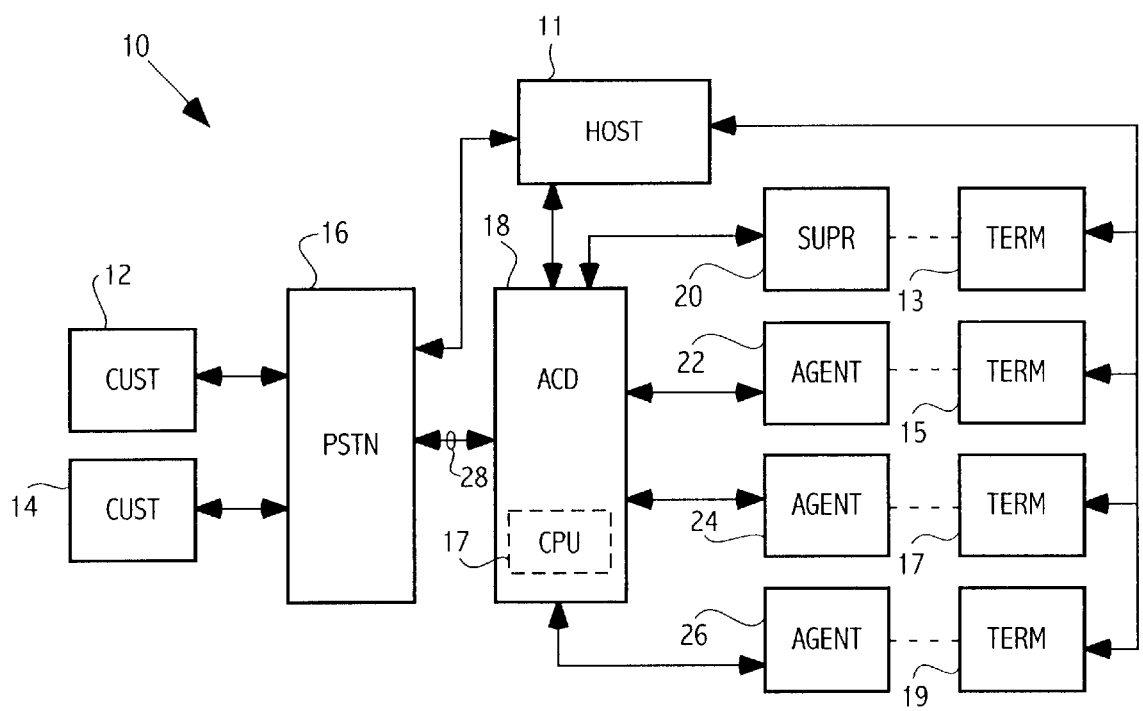
FIG. 1 is a block diagram of an ACD in accordance with an illustrated embodiment of the invention.

FIG. 1 is a block diagram of an ACD system 10, generally, using skill based call routing under an illustrated embodiment of the invention. Under the embodiment, the ACD 18 may receive calls over a number of trunk lines 28 from the PSTI 16 from customers 12, 14 of the ACD 18. Along with the calls, the ACD 18 may receive information about the calls from the PSTN 18. For example, the ACD 18 may receive an identifier of a caller from an automatic number identification (ANI) service operating from within the PSTN 16. The ACD 18 may also receive information about a dialed number through a dialed number identification (DNIS) service or direct inward dial (DID) information from the PSTN 16.

From the information received from the PSTN 16, the ACD 18 may route the call. For example, the ACD 10 may be owned and operated by a department store. Individual call targets may include women's clothing, men's clothing, footwear, housewares, appliances, electronics, furniture, hardware, automotive and garden. Other call targets may include catalog sales or technical support for one or more of the other call targets.

Under the illustrated embodiment, each agent is evaluated and assigned a skill level for his proficiency in servicing calls directed to each particular type of call target. An agent may be assigned a skill level in servicing each type of call (work type) expressed as any number between 0.0 and 1.0 (i.e., where 0.0 indicates no proficiency).

With a skill level for each agent regarding each work type, an agent skill matrix may be created. Within the agent skill matrix, a column may be provided for each work type. Each work type of the skill matrix may contain a list of agents, with agents of the highest skill listed first and other agents listed below by decreasing skill level. It is anticipated that this matrix will change infrequently.

Under the illustrated embodiment, each agent is given a numeric ranking (e.g., 1, 2, etc.) as an indication of responsibility in handling work types. A numeric ranking of one (1) is an indication of the highest responsibility. Two (2) is the second highest. Zero (0) means no responsibility at all and precludes the agent from handling a call of that work type. An agent can have rank 1 for only one work type; there is no such restriction on lesser responsibility rankings. In general, an agent with a higher skill level should have a higher responsibility for each work type, but this is not a strict necessity.

Initially a call is handled by an agent with a responsibility rank of 1 for the work type of the call. This requirement may be relaxed to rank 2, 3, etc. based upon a decay profile (e.g., FIG. 2).

The number of agents required for each work type may be estimated from historical workload and Erlang tables, or from force management packages. For example, a prior history of call loading for a particular work type may be retrieved from an archive. The loading may be increased by some factor based upon most recent history to achieve an initial estimation of the number of agents required for each call type.

To identify agents for the unfilled staff positions of the initial estimation, the CPU 17 performs a "stepwise agent draft". At each step of the agent draft, the CPU 17 selects the work type with the highest percentage of unfilled staff positions. The CPU 17 then examines the agent skill matrix for an agent with the highest skill rating for that work type and selects that agent. The CPU 17 then assigns that agent primary level responsibility (rank=1) for that work type and marks the assignment for the agent on the agent list. The CPU 17 repeats the process until all the unfilled staff positions are filled.

At the conclusion of this procedure, agents in the top portion of the list for any particular work type of the skill matrix would have been given primary assignment for that work type. The other, remaining agents in the list would be candidates for secondary assignment to that work type. (These other, remaining agents would ordinarily have been given a primary assignment in some other work type.)

In the absence of a serious staffing problem (not enough agents with the requisite skills,) every agent listed in the agent matrix would be given a primary assignment in some particular work type. Thus, the agent matrix contains (in addition to the primary agents) a list of potential secondary agents for each work types, which is ordered by skill level for the work type.

The above process has a number of advantages. First, the primary level assignments are exclusive for that agent. That is, an agent is given primary level responsibility for only one work type.

Further, the process ensures that agent skills are distributed equitably over all work types. Each work type is served by the most skilled agents possible. By assigning agents based on idle time, agent utilization is uniform within the work type.

Secondary assignments are made only when required by call loading for a group. Specifically, an increase in a call arrival rate of a particular call type over the initial (or later) loading estimate will trigger secondary assignments.

The need for secondary assignments may be determined by a number of methods. For example, the length of time a caller spends in a call queue is one measure of call loading. However, since callers would be expected to become discouraged and hang-up after a short time period, it is not the only measure available.

One other simple measure of call loading may be based upon the number of calls directed to the call type per time period. Using well known Erlang calculation techniques, this can be converted into a required number of full time agents. The difference between the calculated number of full time agents and the available, primary level agents may be displayed on a supervisors terminal 20. The supervisor may confirm the displayed difference (by activating an ENTER key) and the CPU 17 may assign secondary agents based upon the difference. The supervisor may also alter the displayed differences based upon some group objective, followed by activation of the ENTER key.

Figure 2:
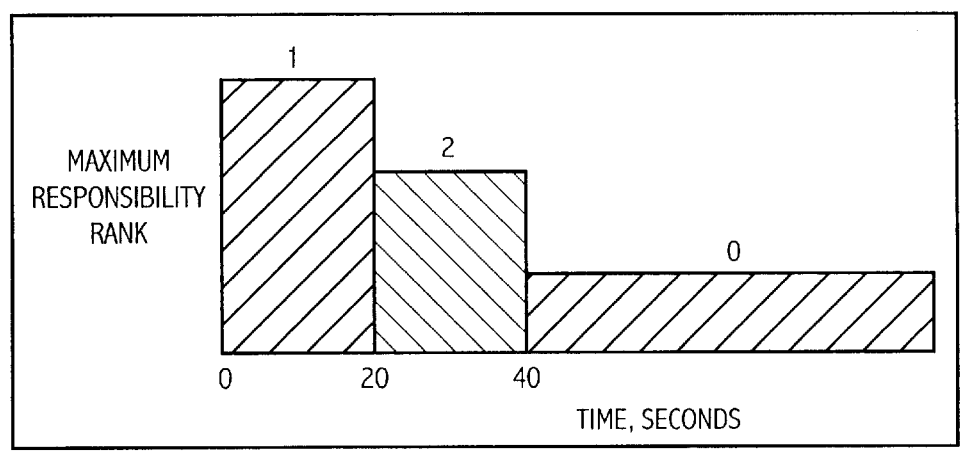
FIG. 2 depicts a decay profile used by the system of FIG. 1.

Once secondary agents have been assigned to a work type, the decay profile of FIG. 2 may be used as a criteria for assignment of a secondary agent (rank=2) to a call. As shown, where a time in queue is less than 20 seconds, calls are not assigned to secondary agents. Where the time in queue exceeds 20 seconds, calls with the longest time in queue would be assigned to secondary agents. Where time in queue exceeds 40 seconds, calls may be assigned to third level agents (rank=3).

Figure 3:
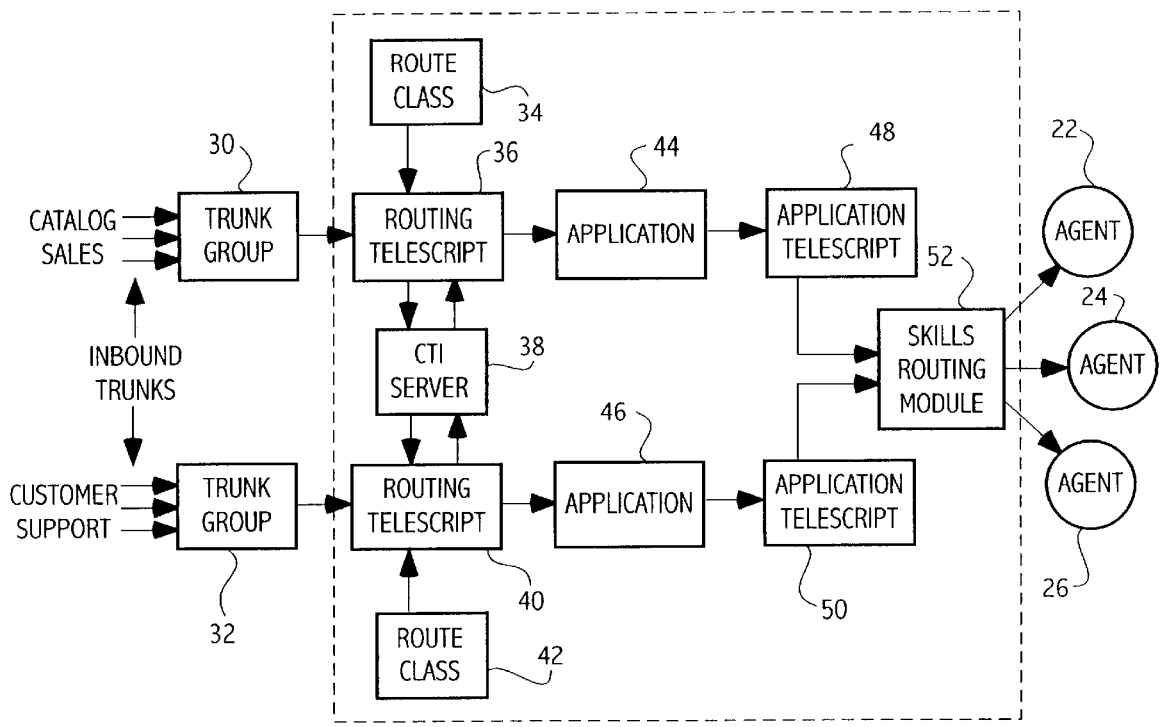
FIG. 3 depicts call processing apparatus used by the system of FIG. 1.

FIG. 3 shows apparatus located within the ACD 18 for routing calls of different work types. As shown, calls arriving on a first trunk group 30 may be directed to catalog sales, while calls arriving on a second trunk group 32 may be directed to customer support. Calls from both of these trunk sources will ultimately be assigned to agents by the skills routing module 52.

As shown, calls received from a trunk group 30, 32 may be directed to a routing telescript 36, 40. Provided as an input to the routing telescript 36, 40 is a routing class. The routing class 34, 42 may be obtained from information delivered to the ACD 18 along with the call from the PSTN 16. The routing class may be determined from automatic number identification (ANI) information, dial number identification service (DNIS) or direct inward dial (DID) information, or from a default associated with the trunk group. The route class suggests, among other things, the application 48, 50 to process the call. Route class information may also be obtained from the CTI server 38 on a host computer. Since the application 44, 46 will be associated with a work type, the route class indirectly specifies the work type.

Figure 4:
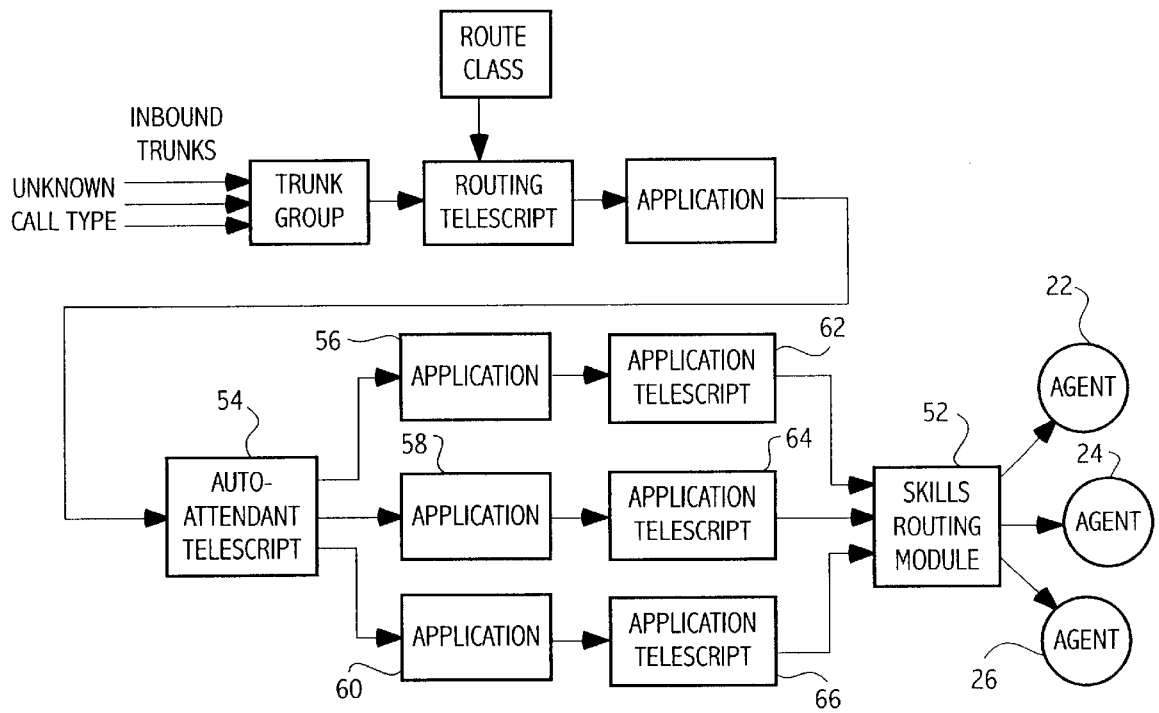
FIGS. 4 and 5 depict alternate call processing apparatus used by the system of FIG. 1.

The application 44, 46 determines, from time-of-day and day-of-week, the telescript 48, 50 to process the call. In some cases this telescript may activate an auto-attendant 54 (FIG. 4) to determine the call target (i.e., the work type) desired by the caller.

The auto-attendant 54 serves the function of requesting information from a caller. The auto-attendant 54 may first present a series of options to the caller. The caller may respond by pressing a particular button on his telephone associated with one of the choices. Alternatively, the caller may provide an audio response that may be decoded by voice recognition features of the auto-attendant 54.

The auto-attendant may route the call to the corresponding application 56, 58, 60 based upon routing information (e.g., route class) and information collected by the auto-attendant. Thus work type and any other information collected by the auto-attendant are provided as inputs to the application 56, 58, 60. In particular, the decay profile may be associated with the application 56, 58, 60.

The application 56, 58, 60 functions to select the work type based upon information associated with the call. The application telescripts 62, 64, 66, on the other hand, function to route the call based upon instructions from the application 56, 58, 60. For instance, one work type may be handled locally, while another work type may be handled from other locations. The application telescripts 62, 64, 66 function to route the call appropriately.

From the application telescripts 62, 64, 66, the call is routed along with the work type to the skills routing module 52. Within the skills routing module 52, the call is assigned to the first available agent 22, 24, 26 with primary responsibility for the work type.

In addition to agent selection, the skills routing module 52 may function to maintain call queues for incoming calls. The skills routing module 52 may assign primary or secondary agents based upon information from the application 56, 58, 60 regarding a decay profile for the call.

If an agent 22, 24, 26 is available when the call is delivered, the skills routing module may assign the call to a primary level agent when received based upon the work type. The primary level agent 22, 24, 26 may be selected based upon which agent has been idle the longest.

If a primary level agent (e.g., ranksl) 22, 24, 26 for the work type is not available, then the skills routing module 52 may place the call in a call queue. As the call waits in the queue, the skills routing module 52 will periodically check the status of the primary level agents to find an available agent. The skills routing module 52 will also track the time each call has waited in the queue and compare the time with the decay profile for that call. Where the time in queue exceeds the threshold time limit, the skills routing module 52 may assign the call to a secondary (or higher) level agent.

When an agent becomes available and calls have been enqueued, the skills routing module 52 will attempt to match the agent with the call. Provided that the agent has the responsibility rank required by the call at that time, the call for which the agent responsibility is highest (i.e., rank number is lowest) will be selected. If none can be found at the highest level, the second highest, third highest, etc., will be considered in sequence. If no call can be found for an agent in this manner, the agent will be placed in an available queue.

Table I provides an example that may be used to illustrate the skill-based routing system described above. As shown, Table I includes four work types: 1) clothing, 2) furniture, 3) hardware and 4) automotive. This table lists for each work type an average time to process a call (handle time) in seconds, calls per hour, the workload (in Erlangs) and the number of agents required. The agents required may be derived by Erlang methods.

TABLE I

Application Staff Requirements

| Application | Handle Time, sec. | Calls per Hour | Workload, Erlangs | Agents Required |
|---|---|---|---|---|
| 1 Clothing | 360 | 118 | 11.8 | 16 |
| 2 Furniture | 300 | 100 | 8.3 | 12 |

TABLE I-continued

Application Staff Requirements

| Application | Handle Time, sec. | Calls per Hour | Workload, Erlangs | Agents Required |
|---|---|---|---|---|
| 3 Hardware | 240 | 100 | 6.7 | 10 |
| 4 Automotive | 420 | 45 | 5.3 | 8 |

An agent skill matrix may be as shown in Table II.

TABLE II

Agent Skill Matrix

| Agent | Application 1 Clothing | Application 2 Furniture | Application 3 Hardware | Application 4 Automotive |
|---|---|---|---|---|
| 1. Amy | 0.6 | 0.9 | 0.9 | 0.8 |
| 2. Bill | 0.7 | 0.6 | 0.0 | 0.8 |
| 3. Claire | 0.9 | 0.5 | 0.9 | 0.0 |
| 4. Doug | 0.8 | 0.8 | 0.6 | 0.9 |
| 5. Elizabeth | 0.8 | 0.7 | 0.6 | 0.9 |
| 6. Frank | 0.8 | 0.0 | 0.9 | 0.7 |
| 7. Gail | 0.5 | 0.5 | 0.0 | 0.9 |
| 8. Harry | 0.8 | 0.7 | 0.0 | 0.8 |
| 9. Irene | 0.0 | 0.8 | 0.7 | 0.0 |
| 10. Jack | 0.6 | 0.6 | 0.8 | 0.6 |
| 11. Kelly | 0.5 | 0.9 | 0.0 | 0.0 |
| 12. Larry | 0.8 | 0.5 | 0.0 | 0.9 |
| 13. Monica | 0.7 | 0.0 | 0.6 | 0.8 |
| 14. Ned | 0.6 | 0.7 | 0.6 | 0.9 |
| 15. Oliver | 0.6 | 0.6 | 0.6 | 0.0 |
| 16. Paul | 0.8 | 0.0 | 0.6 | 0.9 |
| 17. Quentin | 0.0 | 0.7 | 0.9 | 0.7 |
| 18. Ruth | 0.7 | 0.6 | 0.8 | 0.8 |
| 19. Sam | 0.5 | 0.0 | 0.0 | 0.5 |
| 20. Theresa | 0.7 | 0.7 | 0.0 | 0.5 |
| 21. George | 0.7 | 0.6 | 0.7 | 0.6 |
| 22. Violet | 0.8 | 0.7 | 0.6 | 0.0 |
| 23. Walt | 0.8 | 0.5 | 0.9 | 0.7 |
| 24. Zoe | 0.6 | 0.8 | 0.9 | 0.9 |
| 25. Yvonne | 0.6 | 0.0 | 0.6 | 0.0 |
| 26. Bob | 0.5 | 0.5 | 0.0 | 0.6 |
| 27. Alfred | 0.6 | 0.9 | 0.0 | 0.0 |
| 28. Betty | 0.8 | 0.8 | 0.8 | 0.9 |
| 29. Carl | 0.6 | 0.9 | 0.6 | 0.6 |
| 30. Donna | 0.9 | 0.9 | 0.7 | 0.6 |
| 31. Erwin | 0.8 | 0.6 | 0.9 | 0.5 |
| 32. Frances | 0.8 | 0.6 | 0.5 | 0.9 |
| 33. Gwen | 0.7 | 0.9 | 0.9 | 0.6 |
| 34. Harris | 0.7 | 0.8 | 0.6 | 0.6 |
| 35. Ivan | 0.5 | 0.8 | 0.8 | 0.5 |
| 36. Julie | 0.9 | 0.9 | 0.6 | 0.0 |
| 37. Kim | 0.9 | 0.5 | 0.5 | 0.5 |
| 38. Luke | 0.7 | 0.5 | 0.7 | 0.9 |
| 39. Mike | 0.0 | 0.9 | 0.0 | 0.9 |
| 40. Nancy | 0.0 | 0.5 | 0.9 | 0.0 |
| 41. Oscar | 0.6 | 0.6 | 0.9 | 0.8 |
| 42. Patty | 0.6 | 0.0 | 0.9 | 0.0 |
| 43. Robin | 0.5 | 0.8 | 0.7 | 0.8 |
| 44. Sarah | 0.7 | 0.5 | 0.9 | 0.5 |
| 45. Tom | 0.5 | 0.5 | 0.7 | 0.8 |
| 46. Dave | 0.0 | 0.5 | 0.5 | 0.9 |

In Table III, the agents of the agent skill matrix have been ordered based upon their skill for each work type.

TABLE III

Agents Listed In Skill Order Before Agent Draft

| Application 1 | | Application 2 | | Application 3 | | Application 4 | |
|---|---|---|---|---|---|---|---|
| Agent | Skill | Agent | Skill | Agent | Skill | Agent | Skill |
| 3 Claire | 0.9 | 1 Amy | 0.9 | 1 Amy | 0.9 | 4 Doug | 0.9 |
| 30 Donna | 0.9 | 11 Kelly | 0.9 | 3 Claire | 0.9 | 5 Elizabeth | 0.9 |
| 36 Julie | 0.9 | 27 Alfred | 0.9 | 6 Frank | 0.9 | 7 Gail | 0.9 |
| 37 Kim | 0.9 | 29 Carl | 0.9 | 17 Quentin | 0.9 | 12 Lary | 0.9 |
| 4 Doug | 0.8 | 30 Donna | 0.9 | 23 Walt | 0.9 | 14 Ned | 0.9 |
| 5 Elizabeth | 0.8 | 33 Gwen | 0.9 | 24 Zoë | 0.9 | 16 Paul | 0.9 |
| 6 Frank | 0.8 | 36 Julie | 0.9 | 31 Erwin | 0.9 | 24 Zoë | 0.9 |
| 8 Harry | 0.8 | 39 Mike | 0.9 | 33 Gwen | 0.9 | 28 Betty | 0.9 |
| 12 Larry | 0.8 | 4 Doug | 0.8 | 40 Nancy | 0.9 | 32 Frances | 0.9 |
| 16 Paul | 0.8 | 9 Irene | 0.8 | 41 Oscar | 0.9 | 38 Luke | 0.9 |
| 22 Violet | 0.8 | 24 Zoë | 0.8 | 42 Patty | 0.9 | 39 Mike | 0.9 |
| 23 Walt | 0.8 | 28 Betty | 0.8 | 44 Sarah | 0.9 | 46 Dave | 0.9 |
| 28 Betty | 0.8 | 34 Harris | 0.8 | 10 Jack | 0.8 | 1 Amy | 0.8 |
| 31 Erwin | 0.8 | 35 Ivan | 0.8 | 18 Ruth | 0.8 | 2 Bill | 0.8 |
| 32 Frances | 0.8 | 43 Robin | 0.8 | 28 Betty | 0.8 | 8 Harry | 0.8 |
| 2 Bill | 0.7 | 5 Elizabeth | 0.7 | 35 Ivan | 0.8 | 13 Monica | 0.8 |
| 13 Monica | 0.7 | 8 Harry | 0.7 | 9 Irene | 0.7 | 18 Ruth | 0.8 |
| 18 Ruth | 0.7 | 14 Ned | 0.7 | 21 George | 0.7 | 41 Oscar | 0.8 |
| 20 Theresa | 0.7 | 17 Quentin | 0.7 | 30 Donna | 0.7 | 43 Robin | 0.8 |
| 21 George | 0.7 | 20 Theresa | 0.7 | 38 Luke | 0.7 | 45 Tom | 0.7 |
| 33 Gwen | 0.7 | 22 Violet | 0.7 | 43 Robin | 0.7 | 6 Frank | 0.7 |
| 34 Harris | 0.7 | 2 Bill | 0.6 | 45 Tom | 0.7 | 17 Quentin | 0.7 |
| 38 Luke | 0.7 | 10 Jack | 0.6 | 4 Doug | 0.6 | 23 Walt | 0.7 |
| 1 Amy | 0.6 | 18 Ruth | 0.6 | 13 Monica | 0.6 | 21 George | 0.6 |
| 10 Jack | 0.6 | 21 George | 0.6 | 14 Ned | 0.6 | 26 Bob | 0.6 |
| 14 Ned | 0.6 | 31 Erwin | 0.6 | 15 Oliver | 0.6 | 29 Carl | 0.6 |
| 15 Oliver | 0.6 | 32 Frances | 0.6 | 16 Paul | 0.6 | 30 Donna | 0.6 |
| 24 Zoë | 0.6 | 41 Oscar | 0.6 | 22 Violet | 0.6 | 33 Gwen | 0.6 |
| 25 Yvnnne | 0.6 | 3 Claire | 0.5 | 25 Yvonne | 0.6 | 34 Harris | 0.6 |
| 25 Yvonne | 0.6 | 3 Claire | 0.5 | 25 Yuonne | 0.6 | 34 Harris | 0.6 |
| 27 Alfred | 0.6 | 7 Gail | 0.5 | 29 Carl | 0.6 | 19 Sam | 0.5 |
| 29 Carl | 0.6 | 12 Larry | 0.5 | 34 Harris | 0.6 | 20 Theresa | 0.5 |
| 41 Oscar | 0.6 | 23 Walt | 0.5 | 36 Julie | 0.6 | 31 Erwin | 0.5 |
| 42 Patty | 0.6 | 26 Bob | 0.5 | 32 Frances | 0.5 | 3S Ivan | 0.5 |
| 7 Carl | 0.5 | 37 Kim | 0.5 | 37 Kim | 0.5 | 37 Kim | 0.5 |
| 11 Kelly | 0.5 | 38 Luke | 0.5 | 46 Dave | 0.5 | 44 Sarah | 0.5 |
| 19 Sam | 0.5 | 40 Nancy | 0.5 | | | | |
| 26 Bob | 0.5 | 44 Sarah | 0.5 | | | | |
| 35 Ivan | 0.5 | 45 Tom | 0.5 | | | | |
| 43 Robin | 0.5 | 46 Dave | 0.5 | | | | |
| 45 Tom | 0.5 | | | | | | |

In Table IV the results of the agent draft is shown. As shown in Table IV, sixteen agents have been assigned as primary level agents (i.e., rank=1) for the first work type (clothing) based upon the estimate of agents required in Table I. Twelve agent have been assigned to the second group, ten to the third and eight to the fourth.

TABLE IV

Results of Agent Draft (Primary Agent Assignments)

| Application 1 | | Application 2 | | Application 3 | | Application 4 | |
|---|---|---|---|---|---|---|---|
| Agent | Skill | Agent | Skill | Agent | Skill | Agent | Skill |
| 3 Claire | 0.9 | 1 Amy | 0.9 | 6 Frank | 0.9 | 4 Doug | 0.9 |
| 30 Donna | 0.9 | 11 Kelly | 0.9 | 17 Quentin | 0.9 | 5 Elizabeth | 0.9 |
| 36 Julie | 0.9 | 27 Alfred | 0.9 | 23 Walt | 0.9 | 7 Gail | 0.9 |
| 37 Kim | 0.9 | 29 Carl | 0.9 | 24 Zoë | 0.9 | 14 Ned | 0.9 |
| 8 Harry | 0.8 | 33 Gwen | 0.9 | 31 Erwin | 0.9 | 32 Frances | 0.9 |
| 12 Larry | 0.8 | 39 Mike | 0.9 | 40 Nancy | 0.9 | 38 Luke | 0.9 |
| 16 Paul | 0.8 | 9 Irene | 0.8 | 41 Oscar | 0.9 | 46 Dave | 0.9 |
| 22 Violet | 0.8 | 34 Harris | 0.8 | 42 Patty | 0.9 | 45 Tom | 0.8 |
| 28 Betty | 0.8 | 35 Ivan | 0.8 | 44 Sarah | 0.9 | | |
| 2 Bill | 0.7 | 43 Robin | 0.8 | 25 Yvonne | 0.6 | | |
| 13 Monica | 0.7 | 10 Jack | 0.6 | | | | |
| 18 Ruth | 0.7 | 26 Bob | 0.5 | | | | |
| 20 Theresa | 0.7 | | | | | | |

TABLE IV-continued

Results of Agent Draft (Primary Agent Assignments)

| Application 1 | | Application 2 | | Application 3 | | Application 4 | |
|---|---|---|---|---|---|---|---|
| Agent | Skill | Agent | Skill | Agent | Skill | Agent | Skill |
| 21 George | 0.7 | | | | | | |
| 15 Oliver | 0.6 | | | | | | |
| 19 Sam | 0.5 | | | | | | |

Table V shows the agents remaining in the agent skills matrix after the draft. These agents remain available as candidates for secondary responsibility should the need arise. The column labeled "Pri" shows the primary responsibility for each agent.

Table VI shows an Application Staff Report that may appear on the supervisor's terminal 20 as a result of call processing. This report shows the average speed of answer (Avg Spd Ans), service level (Serv Lvl), and average skill level for each work type.

TABLE V

Agents Remaining After Agent Draft

| Application 1 | | | Application 2 | | | Application 3 | | | Application 4 | | |
|---|---|---|---|---|---|---|---|---|---|---|---|
| Agent | Skill | Pri* | Agent | Skill | Pri* | Agent | Skill | Pri* | Agent | Skill | Pri* |
| 4 Doug | 0.8 | 4 | 30 Donna | 0.9 | 1 | 1 Amy | 0.9 | 2 | 12 Larry | 0.9 | 1 |
| 4 Elizabeth | 0.8 | 4 | 36 Julie | 0.9 | 1 | 3 Claire | 0.9 | 1 | 16 Paul | 0.9 | 1 |
| 5 Frank | 0.8 | 3 | 4 Doug | 0.8 | 4 | 33 Gwen | 0.9 | 2 | 24 Zoë | 0.9 | 3 |
| 23 Walt | 0.8 | 3 | 24 Zoë | 0.8 | 3 | 10 Jack | 0.8 | 2 | 28 Betty | 0.9 | 1 |
| 31 Erwin | 0.8 | 3 | 28 Betty | 0.8 | 1 | 18 Ruth | 0.8 | 1 | 39 Mike | 0.9 | 2 |
| 32 Frances | 0.8 | 4 | 5 Elizabeth | 0.7 | 4 | 28 Betty | 0.8 | 1 | 1 Amy | 0.8 | 2 |
| 33 Gwen | 0.7 | 2 | 8 Harry | 0.7 | 1 | 35 Ivan | 0.8 | 2 | 2 Bill | 0.8 | 1 |
| 34 Harris | 0.7 | 2 | 14 Ned | 0.7 | 4 | 9 Irene | 0.7 | 2 | 8 Harry | 0.8 | 1 |
| 38 Luke | 0.7 | 4 | 17 Quentin | 0.7 | 3 | 21 George | 0.7 | 1 | 13 Mnica | 0.8 | 1 |
| 44 Sarah | 0.7 | 3 | 20 Theresa | 0.7 | 1 | 30 Donna | 0.7 | 1 | 18 Ruth | 0.8 | 1 |
| 1 Amy | 0.6 | 2 | 22 Violet | 0.7 | 1 | 38 Luke | 0.7 | 4 | 41 Oscar | 0.8 | 3 |
| 10 Jack | 0.6 | 2 | 2 Bill | 0.6 | 1 | 43 Robin | 0.7 | 2 | 43 Robin | 0.8 | 2 |
| 14 Ned | 0.6 | 4 | 15 Oliver | 0.6 | 1 | 45 Tom | 0.7 | 4 | 6 Frank | 0.7 | 3 |
| 25 Yvonne | 0.6 | 3 | 21 Goerge | 0.6 | 1 | 5 Elizabeth | 0.6 | 4 | 23 Walt | 0.7 | 3 |
| 27 Alfred | 0.6 | 2 | 31 Erwin | 0.6 | 3 | 13 Monica | 0.6 | 1 | 10 Jack | 0.6 | 2 |
| 29 Carl | 0.6 | 2 | 32 Frances | 0.6 | 4 | 14 Ned | 0.6 | 4 | 21 George | 0.6 | 1 |
| 41 Oscar | 0.6 | 3 | 41 Oscar | 0.6 | 3 | 15 Oliver | 0.6 | 1 | 26 Bob | 0.6 | 2 |
| 42 Patty | 0.6 | 3 | 3 Claire | 0.5 | 1 | 16 Paul | 0.6 | 1 | 29 Carl | 0.6 | 2 |
| 7 Gail | 0.5 | 4 | 7 Gail | 0.5 | 4 | 22 Violet | 0.6 | 1 | 30 Donna | 0.6 | 1 |
| 11 Kelly | 0.5 | 2 | 12 Larry | 0.5 | 1 | 29 Carl | 0.6 | 2 | 33 Gwen | 0.6 | 2 |
| 26 Bob | 0.5 | 2 | 23 Walt | 0.5 | 3 | 34 Harris | 0.6 | 2 | 34 Harris | 0.6 | 2 |
| 35 Ivan | 0.5 | 2 | 37 Kim | 0.5 | 1 | 36 Julie | 0.6 | 1 | 19 Sam | 0.5 | 1 |
| 43 Robin | 0.5 | 2 | 38 Luke | 0.5 | 4 | 32 Frances | 0.5 | 4 | 20 Theresa | 0.5 | 1 |
| 45 Tom | 0.5 | 4 | 40 Nancy | 0.5 | 3 | 37 Kim | 0.5 | 1 | 31 Erwin | 0.5 | 3 |
| | | | 44 Sarah | 0.5 | 3 | 46 Dave | 0.5 | 4 | 35 Ivan | 0.5 | 2 |
| | | | 45 Tom | 0.5 | 4 | | | | 37 Kim | 0.5 | 1 |
| | | | 46 Dave | 0.5 | 4 | | | | 44 Sarah | 0.5 | 3 |

*Pri: agent's primary assignment

TABLE VI

Baseline Application Staff Report

Application Staff Report
Covering 30 Minutes; MONDAY 10:00

| Appl # | Appl Name | Avg Spd Ans | Serv Lvl | Pri Agents | Over/Under | Avg pri Skill | Sec Agents | Avg Sec Skill |
|---|---|---|---|---|---|---|---|---|
| 1 | Clothing | 9 | 88 | 16 | | 0.76 | | |
| 2 | Furniture | 8 | 89 | 12 | | 0.81 | | |
| 3 | Hardware | 9 | 87 | 10 | | 0.87 | | |
| 4 | Automotive | 11 | 87 | 8 | | 0.89 | | |

To demonstrate the benefits of the process described above, the calling environment may now be changed. For example, the call rate to the first work type (clothing) may be increased by 20% and the call rate to the second application (furniture) may be decreased by 10%. Table VII shows the Application Staff Report after this change.

As can been seen in Table VII the 20% increase in the call rate of the first work type creates a relative overload in terms of call processing by the agents of that work type. The Application Staff Report shows an understaffing of 2 agents for the first work type and an overstaffing of 1 agent for the second work type. It should also be noted that there has been a sharp decline in the service level for the first work type.

TABLE VII

Application Staff Report After Environmental Change

Application Staff Report
Covering 30 Minutes; MONDAY 10:30

| Appl # | Appl Name | Avg Spd Ans | Serv Lvl | Pri Agents | Over/ Under | Avg pri Skill | Sec Agents | Avg Sec Skill |
|---|---|---|---|---|---|---|---|---|
| 1 | Clothing | 20 | 71 | 16 | −2 | 0.76 | | |
| 2 | Furniture | 7 | 92 | 12 | +1 | 0.81 | | |
| 3 | Hardware | 9 | 88 | 10 | | 0.87 | | |
| 4 | Automotive | 12 | 86 | 8 | | 0.89 | | |

Table VIII shows the agents selected for secondary assignment to the first work type. These may be selected by the CPU 17 from the Application 1 column of Table V. The CPU 17 may select the most qualified or may select agents based upon a "cut and try" routine, with the results of the time in queue of the work type providing the basis for further changes.

Table VIII

Secondary Agents for Application 1

| Agent | Skill | Primary |
|---|---|---|
| 6 Frank | 0.8 | 3 |
| 33 Gwen | 0.7 | 2 |
| 34 Harris | 0.7 | 2 |

Table IX shows the Application Staff Report after the secondary assignments. As shown, the three selected agents are listed as being secondary agents for the first work type. It may also be noted that the average speed of call answer for the first group has dramatically decreased. A corresponding increase may be noted for the service level (i.e., the percentage of calls answered before the service goal for the call type).

TABLE IX

Application Statt Report After Assigning Secondary Agents

Application Staff Report
Covering 30 Minutes; MONDAY 11:00

| Appl # | Appl Name | Avg Spd Ans | Serv Lvl | Pri Agents | Over/ Under | Avg pri Skill | Sec Agents | Avg Sec Skill |
|---|---|---|---|---|---|---|---|---|
| 1 | Clothing | 11 | 82 | 16 | 2 | 0.76 | 3 | 0.74 |
| 2 | Furniture | 8 | 90 | 12 | | 0.81 | | |
| 3 | Hardware | 10 | 86 | 10 | | 0.87 | | |
| 4 | Automotive | 12 | 86 | 8 | | 0.89 | | |

As described above, primary agents are assigned to incoming calls based upon idle time. Where all the primary agents are occupied by prior calls and the queue time increases, calls are assigned to secondary agents based upon the decay profile of FIG. 2.

Figure 5:
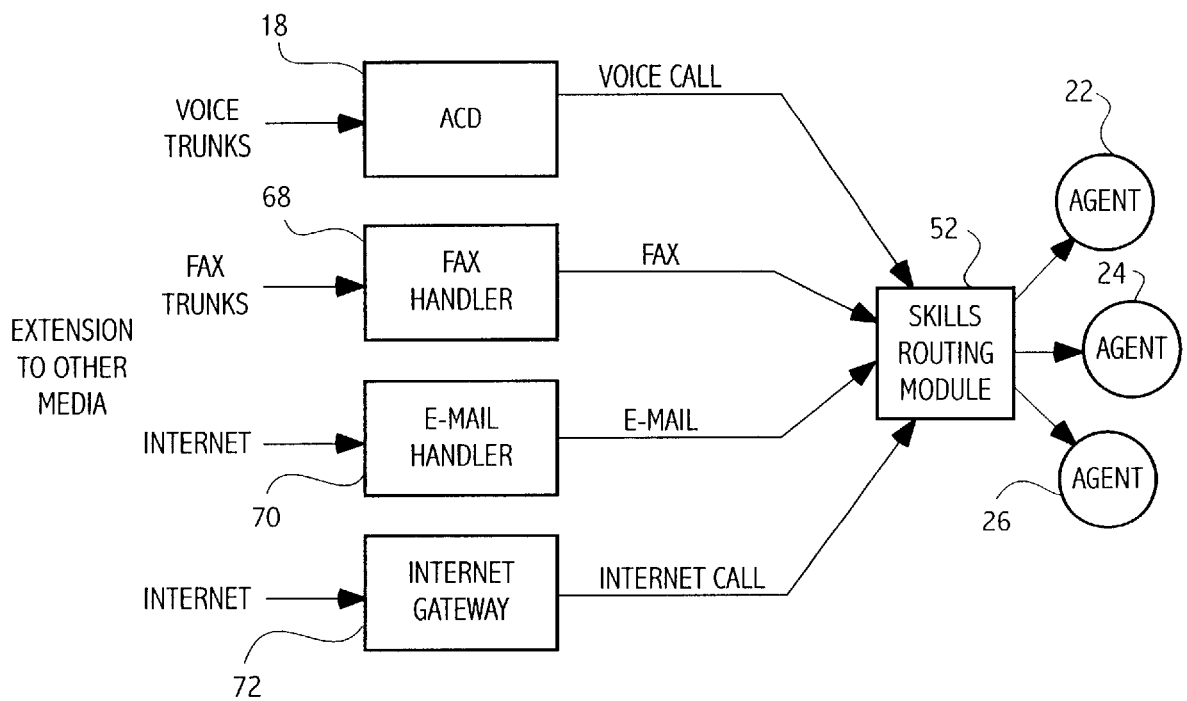

In another embodiment of the invention, the method of assigning agents is extended to the process of handling messages arriving on other media as shown in FIG. 5. As used herein, such a message can also be referred to as a call. For example, referring to FIG. 5, e-mail messages arriving at the e-mail handler 70 are examples of such calls. Agents may be ranked in their ability to handle e-mail as described above for voice calls. Agents may be given primary and secondary responsibility for e-mail, also as described above.

To continue with this example, as e-mail arrives, it may be stored in the e-mail handler 70. As an e-mail call arrives, the e-mail handler 70 may send a request to the skills routing module 52 for assignment of an agent. Upon selection of an agent, the e-mail call is routed to the terminal of an agent 22, 24, 26.

When the e-mail call has been routed to an agent, the skills routing module 52 is notified that the agent is no longer available for other calls. When the agent finishes responding to an e-mail call, he alerts the skills routing module 52 that the message has been handled and that the agent is available to handle other calls.

In a like manner, FAX messages or internet calls may be assigned to agents by the skills routing module 52 as described above.

A specific embodiment of a method and apparatus for an improved skill-based call routing system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of assigning a plurality of agents to agent groups for servicing incoming calls by an automatic call distributor, such method comprising the steps of:

defining a plurality of agent groups for processing calls received by the automatic call distributor;

assigning agents of the plurality of agents to an agent group of the plurality of agent groups based upon a relative skill level of the plurality of agents and a set of required qualifications for the agent group;

delivering calls to the assigned agents of the agent group based upon the required qualifications for the agent group and upon agent idle time;

monitoring an average delay time of calls delivered to agents of the agent group; and adjusting a number of the at least some agents of the group based upon the monitored loading and upon a relative skill level among the plurality of agents.

2. The method of assigning agents as in claim 1 wherein the step of monitoring call loading further comprises monitoring an average delay time between arrival of the calls and delivery of the calls to the at least some agents.

3. The method of assigning agents as in claim 1 wherein the step of assigning the at least some agents to the agent group further comprises identifying a first group of most qualified agents of the plurality of agents available to the automatic call distributor and assigning the most qualified agent to the agent group.

4. The method of assigning agents as in claim 1 wherein the step of defining the plurality of agent groups further comprises defining the set of required qualifications for the agent group of the plurality of agent groups for answering a first type of call.

5. The method of assigning agents as in claim 4 wherein the step of assigning calls to the agent group further comprises determining that a received call is of a first type.

6. The method of assigning agents as in claim 4 wherein the step of determining that a received call is of a first type further comprises receiving automatic number identification (ANI) information from a public switched telephone network.

7. The method of assigning agents as in claim 4 wherein the step of determining that a received call is of a first type further comprises receiving dialed number identification service (DNIS) information from the public switched telephone network.

8. The method of assigning agents as in claim 1 wherein the step of adjusting the number of the at least some agents of the group further comprises identifying at least some secondary agents exceeding the required qualifications of the agent group.

9. The method of assigning agents as in claim 8 wherein the step of adjusting the number of the at least some agents of the group further comprises assigning calls to the at least some secondary agents.

10. The method of assigning agents as in claim 9 wherein the step of assigning calls to the at least some secondary agents further comprises comparing an average delay time of the calls in a call queue with a threshold value.

11. The method of assigning agents as in claim 10 wherein the step of assigning calls to the at least some secondary agents further comprises assigning calls to secondary agents only when the average delay time exceeds the threshold value.

12. The method of assigning agents as in claim 11 wherein the step of assigning calls to secondary agents further comprises selecting a secondary agent based upon secondary agent idle time.

13. A method of identifying agents of a plurality of agents to agent groups for servicing telephone calls of a plurality of call types, such method comprising the steps of:

making an initial estimation of a number of agents required for each call type of the telephone calls of the plurality of call types;

establishing a call group for each call type, the call group having a number of agent positions equal to the initial estimate of the number of agents required for the respective call type;

selecting a call group of the plurality of call groups with a highest percentage of unfilled agent positions;

assigning an agent of the plurality of agents with a highest relative skill level in handling the call type of the selected call group to the selected call group; and repeating the steps of selecting and assigning until each call group has a number of agents assigned to the call group equal to the initial estimate of the number of agents required for the call type.

14. The method of identifying agents as in claim 13 wherein the step of making the initial estimation further comprises estimating the number of agents required from a historical record and adding an adjustment factor.

15. A method of assigning agents of a plurality of agents to agent groups for servicing incoming telephone calls made up of a plurality of call types, such method comprising the steps of:

making an initial estimation of a number of agents required for each call type of the plurality of call types;

establishing a call group for each call type, the call group having a number of agent positions equal to the initial estimate of the number of agents required for the respective call type;

selecting a call group of the plurality of call groups with a highest percentage of unfilled agent positions;

assigning an agent of the plurality of agents with a highest relative skill level in handling the call type of the selected call group to the selected call group;

repeating the steps of selecting and assigning until each call group has a number of agents assigned to the call group equal to the initial estimate of the number of agents required for the call type;

receiving an incoming telephone call of a call type of the plurality of call types;

determining the call type of the incoming telephone call;

assigning the incoming call to an agent of the call group associated with the determined call type based upon an idle time of the agent;

monitoring an average loading level of each of the call groups;

identifying relatively overloaded and relatively underloaded call groups of the monitored call groups; and assigning secondary agents to the relatively overloaded call groups from the relatively underloaded call groups.

16. The method of assigning agents as in claim 15 wherein the step of assigning secondary agents further comprises delaying assignment of the secondary agents in accordance with a decay profile.

17. The method of assigning agents as in claim 15 wherein the step of monitoring an average loading level further comprises calculating an average talk time for each agent of the plurality of groups.

18. The method of assigning agents as in claim 17 wherein the step of monitoring an average loading level further comprises determining an average number of calls per time period handled by each assigned agent based upon an average talk time.

19. The method of assigning agents as in claim 18 wherein the step of monitoring an average loading level further comprises determining an average number of calls received per time period by each group of the plurality of groups.

20. The method of assigning agents as in claim 19 further comprising dividing the average number of calls received by the number of call handled by each agent to determine an actual number of agents needed by each group of the plurality of groups.

21. The method of assigning agents as in claim 20 further comprising subtracting the actual number of agents needed by each group from the estimation of the number of agents required to obtain a loading difference.

22. The method of assigning agents as in claim 21 further comprising comparing the loading difference with a threshold value.

23. The method of assigning agents as in claim 21 further comprising designating groups with a negative loading difference which exceeds the threshold as an overloaded call group and call groups with a positive loading difference which exceeds the threshold as an underloaded call group.

24. An apparatus for assigning a plurality of agents to agent groups for servicing incoming calls received by an automatic call distributor, such apparatus comprising:

means for defining a plurality of agent groups for processing calls received by the automatic call distributor;

means for assigning at least some agents of the plurality of agents to an agent group of the plurality of agent groups based upon a relative skill level of the at least some agents of a set of required qualifications for the agent group;

monitoring an average delay time of calls delivered to agents of the agent group; and means for adding at least some remaining agents of the plurality of agents to the agent group based upon the monitored loading and upon a relative skill level.

25. The apparatus for assigning agents as in claim 24 wherein the means for monitoring call loading further comprises means for monitoring an average delay time between arrival of the calls and delivery of the calls to the at least some agents.

26. The method of assigning agents as in claim 24 wherein the means for assigning the at least some agents to the agent group further comprises means for identifying a first group of most qualified agents of the plurality of agents available to the automatic call distributor and assigning the most qualified agent to the agent group.

27. The apparatus for assigning agents as in claim 24 wherein the means for defining the plurality of agent groups further comprises means for defining the set of required qualifications for the agent group of the plurality of agent groups for answering a first type of call.

28. The apparatus for assigning agents as in claim 27 wherein the means for assigning calls to the agent group further comprises means for determining that a received call is of a first type.

29. The apparatus for assigning agents as in claim 27 wherein the means for determining that a received call is of a first type further comprises means for receiving automatic number identification (ANI) information from a public switched telephone network.

30. The apparatus for assigning agents as in claim 27 wherein the step of determining that a received call is of a first type further comprises receiving dialed number identification service (DNIS) information from the public switched telephone network.

31. The apparatus for assigning agents as in claim 24 wherein the means for adjusting the number of the at least some agents of the group further comprises means for identifying at least some secondary agents exceeding the required qualifications of the agent group.

32. The apparatus for assigning agents as in claim 31 wherein the means for adjusting the number of the at least some agents of the group further comprises means for assigning calls to the at least some secondary agents.

33. The apparatus for assigning agents as in claim 32 wherein the means for assigning calls to the at least some secondary agents further comprises means for comparing an average delay time of the calls in a call queue with a threshold value.

34. The apparatus for assigning agents as in claim 33 wherein the means for assigning calls to the at least some secondary agents further comprises means for assigning calls to secondary agents only when the average delay time exceeds the threshold value.

35. The apparatus for assigning agents as in claim 34 wherein the means for assigning calls to secondary agents further comprises means for selecting a secondary agent based upon secondary agent idle time.

36. An apparatus for identifying agents of a plurality of agents to agent groups for servicing telephone calls of a plurality of call types, such apparatus comprising:

means for making an initial estimation of a number of agents required for each call type of the telephone calls of the plurality of call types;

means for establishing a call group for each call type, the call group having a number of agent positions equal to the initial estimate of the number of agents required for the respective call type;

means for selecting a call group of the plurality of call groups with a highest percentage of unfilled agent positions;

means for assigning an agent of the plurality of agents with a highest relative skill level in handling the call type of the selected call group to the selected call group; and means for repeating the steps of selecting and assigning until each call group has a number of agents assigned to the call group equal to the initial estimate of the number of agents required for the call type.

37. The apparatus for identifying agents as in claim 36 wherein the step of making the initial estimation further comprises estimating the number of agents required from a historical record and adding an adjustment factor.

38. A apparatus for assigning agents of a plurality of agents to agent groups for servicing incoming telephone calls made up of a plurality of call types, such method comprising the steps of:

means for making an initial estimation of a number of agents required for each call type of the plurality of call types;

means for establishing a call group for each call type, the call group having a number of agent positions equal to the initial estimate of the number of agents required for the respective call type;

means for selecting a call group of the plurality of call groups with a highest percentage of unfilled agent positions;

means for assigning an agent of the plurality of agents with a highest relative skill level in handling the call type of the selected call group to the selected call group;

means for repeating the steps of selecting and assigning until each call group has a number of agents assigned to the call group equal to the initial estimate of the number of agents required for the call type;

means for receiving an incoming telephone call of a call type of the plurality of call types;

means for determining the call type of the incoming telephone call;

means for assigning the incoming call to an agent of the call group associated with the determined call type based upon an idle time of the agent;

means for monitoring an average loading level of each of the call groups;

means for identifying relatively overloaded and relatively underloaded call groups of the monitored call groups; and means for assigning secondary agents to the relatively overloaded call groups from the relatively underloaded call groups.

39. The apparatus for assigning agents as in claim 38 wherein the means for assigning secondary agents further comprises means for delaying assignment of the secondary agents in accordance with a decay profile.

40. The apparatus for assigning agents as in claim 38 wherein the means for monitoring an average loading level further comprises means for calculating an average talk time for each agent of the plurality of groups.

41. The apparatus for assigning agents as in claim 40 wherein the means for monitoring an average loading level further comprises means for determining an average number of calls per time period handled by each assigned agent based upon an average talk time.

42. The apparatus for assigning agents as in claim 41 wherein the means for monitoring an average loading level further comprises means for determining an average number of calls received per time period by each group of the plurality of groups.

43. The apparatus for assigning agents as in claim 42 further comprising means for dividing the average number of calls received by the number of call handled by each agent to determine an actual number of agents needed by each group of the plurality of groups.

44. The apparatus for assigning agents as in claim 43 further comprising means for subtracting the actual number of agents needed by each group from the estimation of the number of agents required to obtain a loading difference.

45. The apparatus for assigning agents as in claim 44 further comprising means for comparing the loading difference with a threshold value.

46. The apparatus for assigning agents as in claim 44 further comprising means for designating groups with a negative loading difference which exceeds the threshold as an overloaded call group and call groups with a positive loading difference which exceeds the threshold as an underloaded call group.

* * * * *